United States Patent [19] | [11] 4,206,944
Kumagai et al. | [45] Jun. 10, 1980

[54] LID DEVICE FOR USE IN A MOTORCAR

[75] Inventors: Kiyoshi Kumagai, Toyoda; Toshio Awamura, Okazaki; Kiyoshi Aikawa; Tatsuo Tatematsu, both of Nagoya, all of Japan

[73] Assignees: Mitsubishi Jidosha Kogyo Kabushiki Kaisha; Kabushiki Kaisha Tatematsu Seisakusho, both of Japan

[21] Appl. No.: 940,137

[22] Filed: Sep. 6, 1978

[30] Foreign Application Priority Data

Sep. 8, 1977 [JP] Japan ........................... 52-120009[U]
Jul. 17, 1978 [JP] Japan ................................. 53-87603

[51] Int. Cl.² ............................................. B62D 25/10
[52] U.S. Cl. .................................... 296/76; 180/69 C
[58] Field of Search ..................... 296/50, 57 R, 57 A, 296/56, 106, 76; 180/69 C

[56] References Cited

U.S. PATENT DOCUMENTS

| | | | |
|---|---|---|---|
| 1,791,643 | 2/1931 | Smith | 296/76 |
| 2,320,752 | 6/1943 | Roethel | 296/76 |
| 2,548,492 | 4/1951 | Rivard | 180/69 C |
| 2,639,462 | 5/1953 | Fish | 296/76 |
| 2,702,401 | 2/1955 | Vigmostad | 296/76 |
| 2,800,361 | 7/1957 | Kubacka | 296/76 |
| 3,643,755 | 2/1972 | Gionet | 296/76 |
| 4,125,170 | 11/1978 | Botz | 296/76 |

FOREIGN PATENT DOCUMENTS

| | | | |
|---|---|---|---|
| 2223208 | 11/1973 | Fed. Rep. of Germany | 296/76 |

*Primary Examiner*—John J. Love
*Assistant Examiner*—John A. Carroll
*Attorney, Agent, or Firm*—Wenderoth, Lind & Ponack

[57] ABSTRACT

An opening/closing device for a lid adapted to openably cover an opening of, for example, a trunk of a motorcar does not substantially project into the trunk when the lid is closed. An elongated guide slot extends along a side edge of the opening. A first arm member has one end fixedly secured to the lid and the other end slidably fitted in the guide slot. A second arm member has one end pivotably mounted on the first arm member or on the lid and the other end pivotably mounted on the side edge of the opening. The first and second arm members are adapted to be folded into positions substantially parallel to each other when the lid is closed.

12 Claims, 10 Drawing Figures

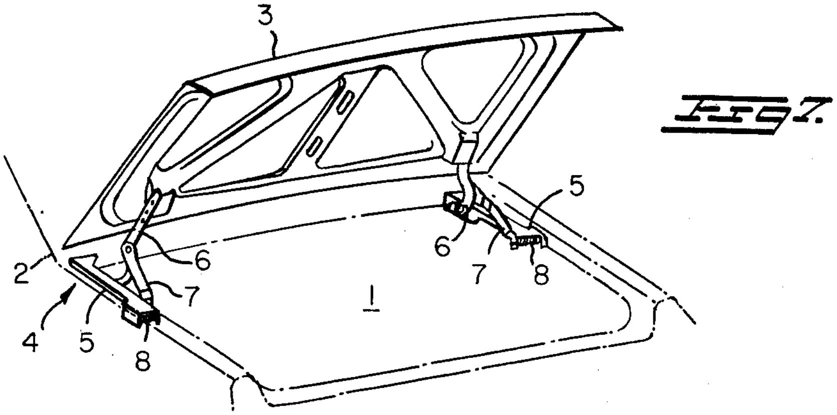
FIG. 7.
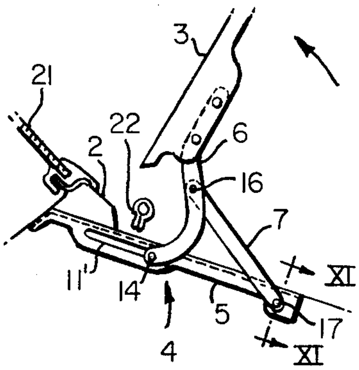
FIG. 8.
FIG. 9.
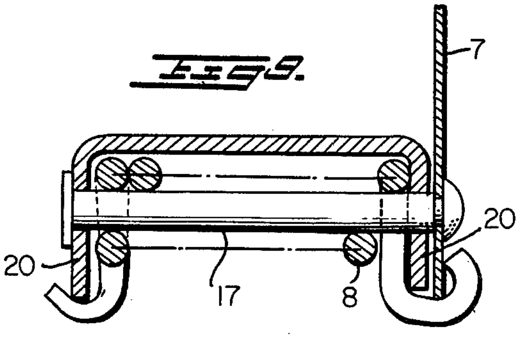
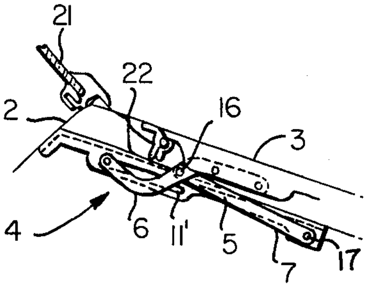
FIG. 10.

LID DEVICE FOR USE IN A MOTORCAR

BACKGROUND OF THE INVENTION

The present invention relates to improvements in a lid device for a trunk lid, an engine hood or the like in a motorcar.

In heretofore known trunk lid devices for motorcars, it was common practice for a lid for covering a trunk opening of a car body to be openably mounted at the opening via a hinge device, and in order to maintain water-tightness of the interior of the trunk when the lid is closed, a weather strip is interposed along the peripheral edge of the opening against which the peripheral edge of the lid strikes. In addition, such hinge device is generally composed of an arm member having one end fixedly secured to the lid and the other end pivotably mounted on the peripheral edge of the opening. In order that, upon opening of the lid, the hinge device or the lid will not interfere with the weather strip and damage the water-tight capability of the weather strip and that, upon closure of the lid, the appearance of the lid device may be improved by making the hinge device not visible from the exterior, normally the arm member is formed in a U-shape considerably curved towards the interior of the trunk in the proximity of the peripheral edge of the opening. In such a prior art lid device, since the U-shaped curved portion of the arm member projects considerably into the trunk upon closure of the lid, inconvenience occurs in that the effective space of the trunk room is reduced, and there is the disadvantage that baggage in the trunk may be struck by the arm and thereby damaged.

SUMMARY OF THE INVENTION

Therefore, it is an object of the present invention to provide a lid device for use in a motorcar and which is free from the aforementioned shortcomings of the lid device of the prior art.

According to one feature of the present invention, there is provided a lid device for use in a motorcar having an opening formed in a car body, a lid adapted to openably cover such opening, a guide slot of elongated hole shape disposed on a side edge portion of the opening and extending substantially along the direction of the side edge, a first arm member having a first end fixedly secured to the lid and a second end slidably fitted in the guide slot, a second arm member having a first end pivotably mounted on the first arm member or the lid and a second end pivotably mounted on the side edge portion of the opening, and a spring member provided between the lid and the car body to bias the lid so as to be normally opened, the guide slot, the first arm member and the second arm member being adapted to be folded into positions substantially parallel relationship to each other when the lid is closed.

BRIEF DESCRIPTION OF THE DRAWINGS

The above-mentioned and other features and objects of the present invention will become more apparent from the following description taken in conjunction with the accompanying drawings, in which FIG. 7 is a perspective view of a lid device according to a second preferred embodiment of the present invention.

FIG. 8 is a side view of an opening/closing device on the right side of the lid device shown in FIG. 7, FIG. 9 is an enlarged cross-sectional view taken along line IX—IX in FIG. 8 as viewed in the direction of arrows, and FIG. 10 is a side view of the opening/closing device of FIG. 8 upon closure of the lid.

DETAILED DESCRIPTION OF THE INVENTION

Figure 1:
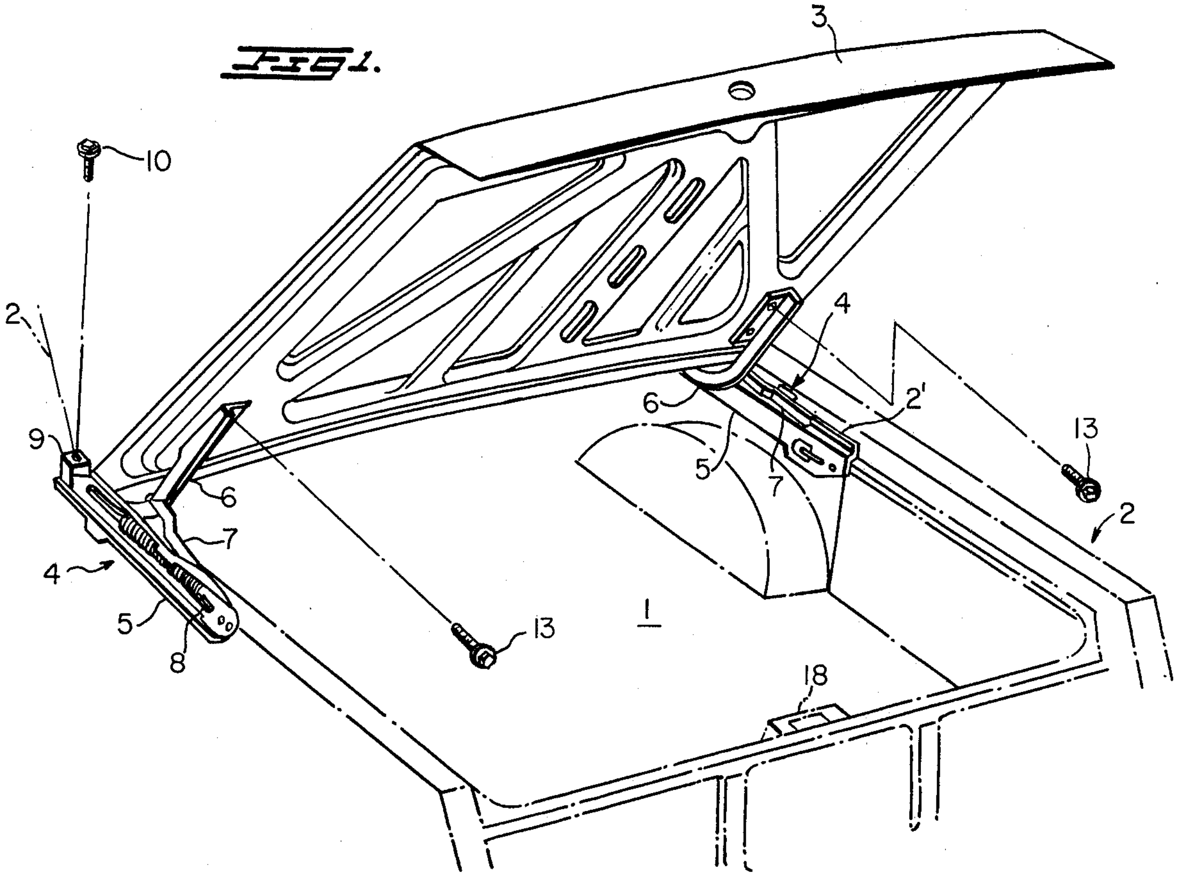
FIG. 1 is a perspective view of a lid device according to a first preferred embodiment of the present invention.

The present invention will now be described in connection with a first preferred embodiment as applied to a trunk lid provided for a trunk at the rear portion of a car body of a passenger car. In FIGS. 1 to 5, reference numeral 1 designates an opening of a trunk disposed at a rear portion of a car body 2, and numeral 3 designates a lid mounted via an opening/closing device 4 as described later on a side edge 2' on the car body side which defines the opening 1.

Describing the opening/closing device in greater detail, this device comprises, as its principal component members, a base plate 5, a first arm 6, a second arm 7 having its opposite ends pivotably mounted on the base plate 5 and the first arm 6, respectively, and a coil spring 8 stretched between the base plate 5 and the first arm 6. Reference numeral 9 designate bolt holes for receiving bolts 10, and by means of these bolts 10 the base plate 5 is mounted on a side edge portion 2' of the car body 2. The base plate 5 has a guide slot 11' of elongated shape extending substantially along the direction of the side edge of the opening, and along the inner peripheral edge of the guide slot 11' is interposed a guide frame member 11 that is preferably made of anti-abrasion synthetic resin material.

Figure 5:
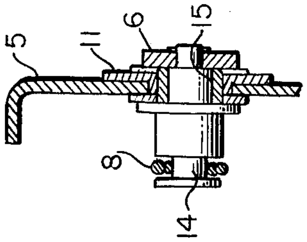
FIG. 5 is a cross-sectional view taken along line V—V in FIG. 3 as viewed in the direction of arrows.
Figure 4:
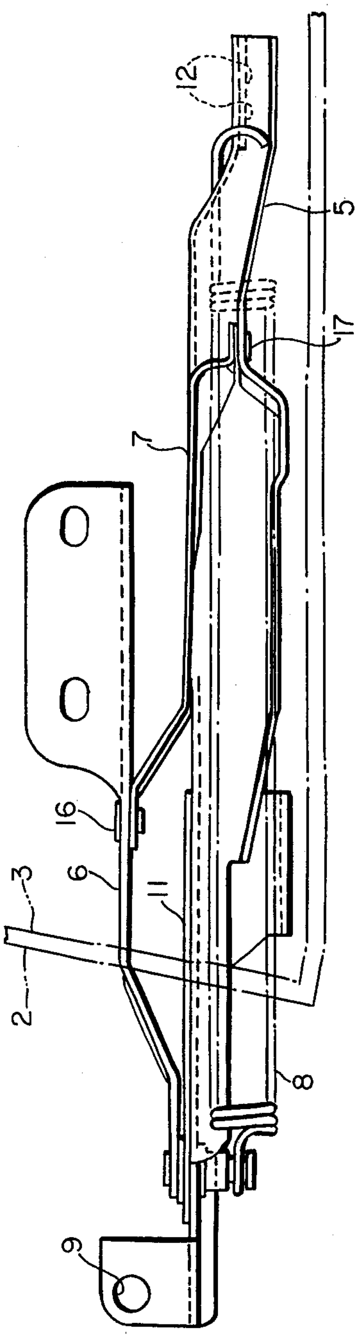
FIG. 4 is a plan view of the opening/closing device of FIGS. 2 and 3.

Reference numeral 12 designates small holes provided in an aligned manner at one end portion of the base plate for engaging with one end of the spring 8. The aforementioned first arm 6 is, at one end thereof, fixedly secured to the bottom surface of the lid 3 by a bolt 13, and has a slide pin 14 fixedly secured to the other end thereof. Reference numeral 15 (FIG. 5) designates a cylindrical sleeve fitted around the pin 14 and preferably made of anti-abrasion synthetic resin material, which is slidably and rotatably fitted in the elongated slot of the guide frame member 11. In addition, at a free end portion of the pin 14 is anchored by the other end of the above-mentioned spring 8. Thus, the pin 14 is normally biased in the rightward direction (as viewed in FIG. 2) of the elongated slot of the guide frame member 11 by the spring 8 as shown in FIG. 5. Reference numeral 16 designates a pin for pivotably mounting one end portion of the second arm 7 at the center portion of the first arm 6, and numeral 17 designates another pin for pivotably mounting the other end of the second arm 7 on the base plate 5. It is to be noted that reference numeral 18 in FIG. 1 designates a lock device fo maintaining the lid 3 in its closed position.

Figure 2:
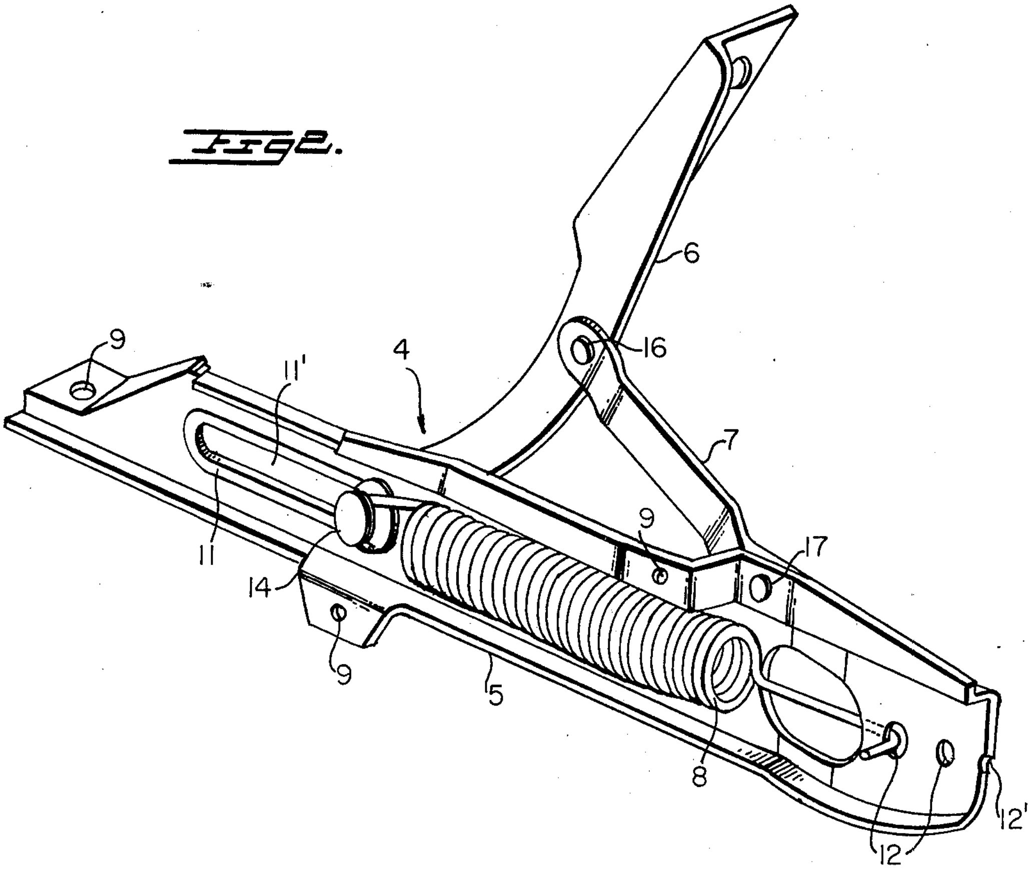
FIG. 2 is a perspective view of an opening/closing device on the left side of the lid device shown in FIG. 1.
Figure 3:
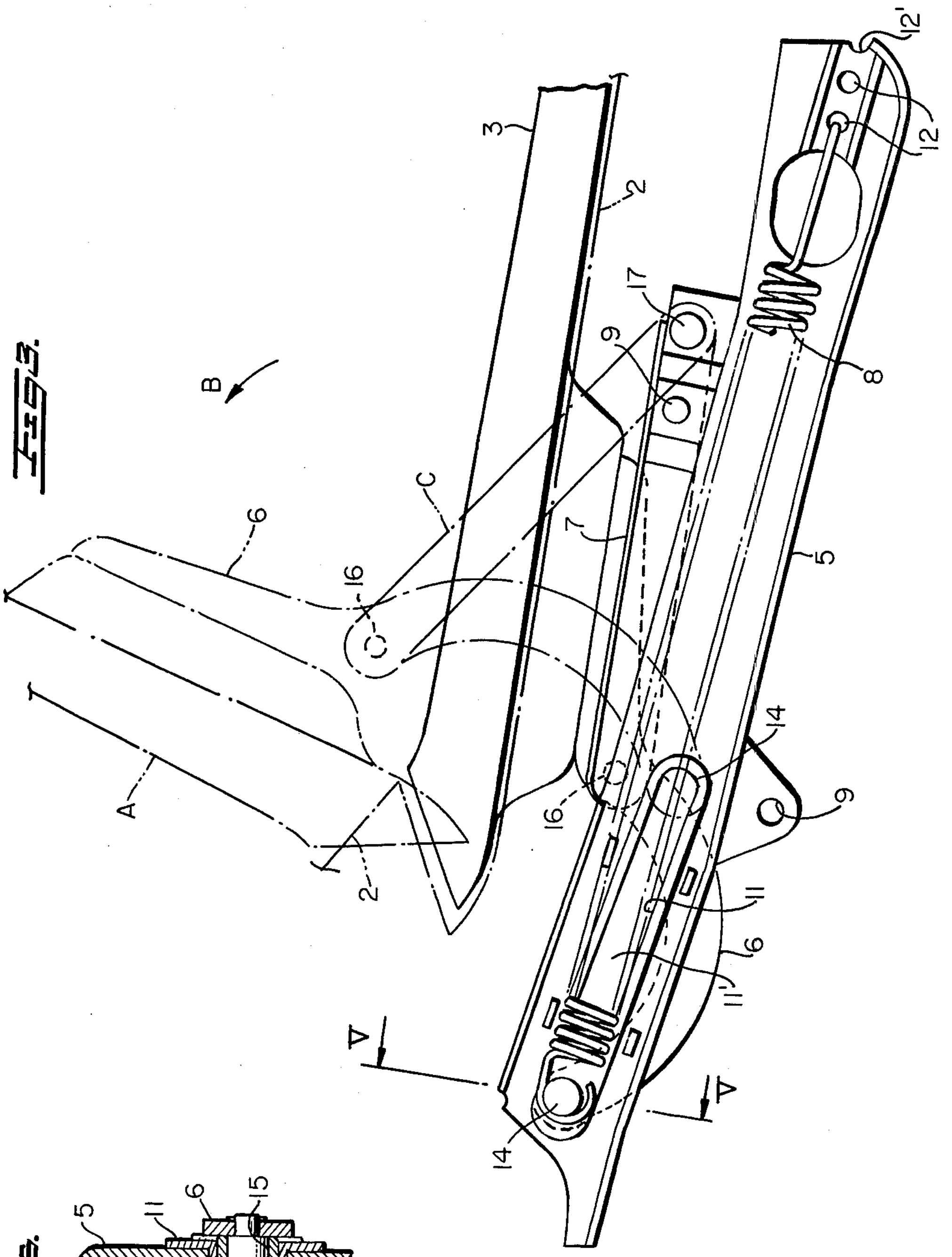
FIG. 3 is a side view of the opening/closing device of FIG. 2 showing a closed position thereof in solid lines and an opened position thereof in phantom lines.

Description will now be made of the operation of the lid device according to the above-described embodiment of the present invention. If the lid 3, when in its opened position as shown in FIGS. 1 and 2, is moved downwardly, then the lid 3 is closed as shown by the solid lines in FIG. 3 and is held at its closed position by the lock device 18. During this closing operation, the slide pin 14 of the first arm 6 is displaced in the elongated slot by sliding from its right end position towards its left end position (as shown in the drawings), so that the lid 3 is rotated from the opened position indicated by double dot chain lines A to the closed position indicated by solid lines in FIG. 3. Under this closed condition, after the lock device 18 has been released, if a small force is applied to the rear edge of the lid 3 in the direction shown by arrow B, then the opening force exerted upon the lid 3 acts upon the second arm 7 via the pin 16, so that the second arm 7 rotates in the clockwise direction about the pin 17. At the same time, the slide pin 14 of the first arm 6 makes a sliding movement in the rightward direction within the elongated slot of the guide frame member 11. Then, the resilient force of the spring 8 stretched between the slide pin 14 and the small hole 12 acts upon the lid 3 in a direction for further opening the lid 3 in cooperation with the manual opening force exerted upon the lid 3. Thus, when the slide pin 14 has struck against the right end of the guide slot 11', the first arm 6 and the second arm 7 are displaced to the positions indicated by the double dot chain lines A as shown in FIG. 3, and so, even after the manual opening force has been removed, the lid 3 can be maintained at its opened state owing to the resilient force of the spring 8. In this opened condition, a triangle is formed by the three pins, that is, the slide pin 14, pin 16 and pin 17. Subsequently, in the case where the lid 3 is closed starting from the above-mentioned opened condition, a manual force is applied to the lid 3 in a direction opposite to the arrow B against the resilient force of the spring 8. Then, the first arm 6 and the second arm 7 are displaced in directions opposite to those described above and are folded into positions substantially parallel with each other as shown by solid lines in FIG. 3, the slide pin 14 being restored to its original position, and thus the lid 3 is displaced to the position closing the opening 1 of the trunk and is held at that position by the lock device 18. Adjustment of the resilient force of the spring 8 can be arbitrarily made by making the right end of the spring 8 engage with another adjacent small hole 12 or a notch 12'.

As described above, according to the above-described embodiment of the present invention, since the second arm 7 is interposed between the first arm 6 and the base plate 5 and the slide pin 14 of the first arm 6 is made slidable along the guide slot 11', the extent of projection of the first arm 6 into the trunk upon closure of the lid 3 can be made small. In addition, since the guide frame member 11 made of anti-abrasion synthetic resin material is provided in the guide slot 11', the above-described lid device has the advantage that noise caused by sliding of the slide pin 14 can be reduced. Accordingly, in addition to the advantage that reduction of the effective space of a trunk and damage to baggage in the trunk caused by the lid device can be effectively prevented, since the spring 8 can be assembled within the base plate 5, mounting of the spring 8 is easier than in the case of employing a torsion bar, and the construction of the first arms 6, 6 on the respective sides of the trunk room can be made simpler.

Figure 6:
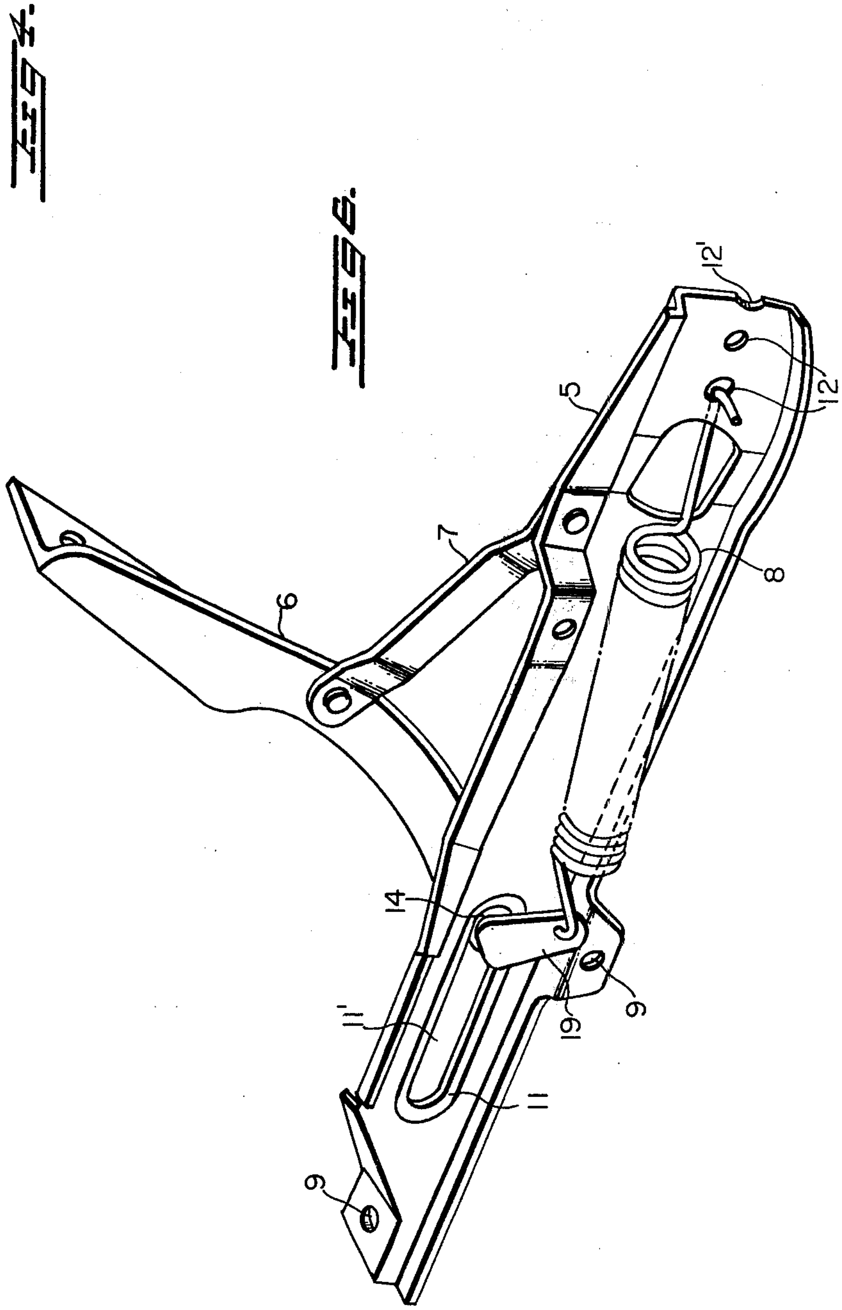
FIG. 6 is a perspective view of a modification of the opening/closing device shown in FIGS. 2 to 5.

While the left end of the spring 8 is engaged with the slide pin 14 in the above-described structure, it could be engaged with a pin arm 19 fixedly mounted to the slide pin 14 as shown in FIG. 6. In this case, since a torque calculated by multiplying the length of the pin arm 19 by the tension of the spring 8 is applied to the first arm 6 via the slide pin 14, the opening/closing operation of the lid 3 can be effected smoothly. In addition, though the guide slot 11' is formed in the base plate 5 and the second arm 7 is fixedly secured to the base plate 5 in the above-described embodiment, in place of providing the base plate 5 it is, of course, possible to form a guide slot and small holes for engaging with a spring which have the same functions as those formed in the base plate 5 and pivotably mount the second arm 7 on a car body structure member itself. Furthermore, although one end of the second arm 7 is pivotably mounted on the first arm 6 in the above-described embodiment, it could be pivotably mounted directly on the lid 3. Still further, in the above-described embodiment, even if either one of the guide frame member 11 and the sleeve 15 is omitted, the reduction of the noise of sliding can still be, expected, and in the case where the effect of reducing the noise of sliding in the aforementioned most preferable embodiment is not always necessary, both of the guide frame member 11 and the sleeve 15 could be omitted.

A second preferred embodiment of the present invention will now be described with reference to FIGS. 7 to 10. It is to be noted that in these figures members equivalent to those shown in FIGS. 1 to 6 are designated by the same reference numerals as those used in FIGS. 1 to 6. The only differences in structure between the above-described first preferred embodiment and the second preferred embodiment exist in that the cross-sectional configuration of the base plate 5 in the first preferred embodiment is of a C-shape, whereas in the second preferred embodiment the cross-sectional configuration of the base plate 5 is, at least partly, of an inverse U-shape, and in that the spring 8 in the first preferred embodiment is stretched between the slide pin 14 or pin arm 19 and the base plate 5, whereas in the second preferred embodiment the spring 8 is a torsion spring wound around a pin 17 used for pivotably mounting the second arm 7 on the base plate 5, one end of the spring 8 being engaged with the base plate 5, and the other end being engaged with the second arm 7. With regard to the structure of the remaining parts, the second preferred embodiment is substantially identical to the first preferred embodiment. As shown in FIG. 9, the rear end of the base plate 5 is formed in an inverse U-shaped configuration, and a pin 17 is bridged across legs 20 thereof. Around the pin 17 is wound a coil spring 8, the left end of the spring 8 being engaged with the leg 20 on the left side of the base plate, while the right end of the spring 8 being engaged with the second arm 7 located adjacent to the leg 20 on the right side of the base plate. Thereby the lid 3 may be normally biased so as to be rotated in the opening direction. It is to be noted that reference numeral 21 designates a rear window glass plate, and numeral 22 designates a weather strip.

Since the second preferred embodiment of the present invention is constructed as described above, when the lid 3 is closed the opening/closing device 4 is in the position shown in FIG. 10, whereas when the lid 3 is opened, the lid 3 is biased open by the resilient force of the spring 8 as shown in FIG. 8, the opening/closing device 4 moves to the position shown in FIG. 8, and thereby functions and advantages similar to those of the first preferred embodiment can be realized.

While the present invention has been described above in connection with preferred embodiments as applied to a trunk lid, the present invention is not limited to such an application, but rather can be equally applied to an engine hood. In addition, when the trunk lid 3 is opened and closed it is necessary to ensure that the tip end portion of the lid 3 does not strike against the car body (rear deck) 2, and in the case where the tip end portion is displaced to the position of the window glass plate, it is necessary to ensure that the tip end portion of the lid 3 does not strike against the rear window glass plate. In this connection, the locus of the tip end portion of the lid 3 is determined depending upon the shape of the guide slot 11', and although the guide slot 11' is formed in a rectilinear shape to prevent the tip end portion of the lid 3 from striking against the car body 2 in the above-described preferred embodiments, if the shape of the car body 2 or the inclination of the window glass plate is varied, then the shape of the guide slot 11' is changed into an arcuate shape or the like to prevent the tip end portion from striking against the car body or window glass plate.

What is claimed is:

1. In a combination including a motorcar body having therein an opening at least partially defined by at least one side edge portion extending in a longitudinal direction, a lid adapted to openably cover said opening, and at least one opening/closing device hingedly connecting said lid to said body for movement between a first position whereat said lid uncovers said opening and a second position whereat said lid covers said opening, the improvement wherein said opening/closing device comprises:

a base plate mounted on said side edge portion and extending in said longitudinal direction;

said base plate having formed therein an elongated guide slot extending substantially in said longitudinal direction;

a first arm member having a first end fixedly and non-pivotably secured to said lid and a second end mounted for sliding movement along said guide slot;

a second arm member having a first end pivotably connected to said first arm member at a position between first and second ends thereof and a second end pivotably mounted at a position adjacent said side edge portion;

said first and second arm members being movable between respective first positions thereof extending outwardly from said base plate when said lid is in said first position thereof, and respective second positions thereof extending substantially parallel to each other and to said guide slot when said lid is in said second position thereof; and spring member means, having a first end acting on said base plate and a second end acting on one of said second end of said first arm member and said second end of said second arm member, for biasing said first and second arm members to said respective first positions thereof and for thereby biasing said lid to said first position thereof.

2. The improvement claimed in claim 1, further comprising a pin member mounted on said second end of said first arm member, said pin member being slidably fitted in said guide slot.

3. The improvement claimed in claim 2, further comprising a sleeve formed of anti-abrasion synthetic resin material and fitted around said pin member.

4. The improvement claimed in claim 2, further comprising a link arm mounted on said pin member, and wherein said second end of said spring member means is connected to said link arm.

5. The improvement claimed in claim 1, wherein said second end of said second arm member is pivotably connected to said base plate.

6. The improvement claimed in claim 1, further comprising a guide frame member formed of anti-abrasion synthetic resin material and provided along the edge of said guide slot in said base plate.

7. The improvement claimed in claim 1, wherein said guide slot has an elongated rectangular configuration.

8. The improvement claimed in claim 1, wherein said second end of said spring member means is connected to said second end of said first arm member.

9. The improvement claimed in claim 1, further comprising means for adjusting the biasing force of said spring member means, said adjusting means comprising a plurality of longitudinally spaced engaging holes formed in said base plate, said first end of said spring member means being selectively engageable in one of said holes.

10. The improvement claimed in claim 1, wherein said second end of said spring member means engages said second end of said second arm member.

11. The improvement claimed in claim 10, further comprising a shaft pivotably mounting said second end of said second arm member to said base plate, and wherein said spring member means comprises a torsion spring surrounding said shaft.

12. The improvement claimed in claim 11, wherein said base plate has an inverted U-shaped transverse cross-sectional configuration including spaced parallel legs, said shaft extends transversely between said legs.

* * * * *